United States Patent
Zhao

(10) Patent No.: US 11,061,479 B2
(45) Date of Patent: Jul. 13, 2021

(54) METHOD, DEVICE AND READABLE STORAGE MEDIUM FOR PROCESSING CONTROL INSTRUCTION BASED ON GESTURE RECOGNITION

(71) Applicant: BAIDU ONLINE NETWORK TECHNOLOGY (BEIJING) CO., LTD., Beijing (CN)

(72) Inventor: Chen Zhao, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 154 days.

(21) Appl. No.: 16/454,958

(22) Filed: Jun. 27, 2019

(65) Prior Publication Data

US 2020/0012351 A1 Jan. 9, 2020

(30) Foreign Application Priority Data

Jul. 4, 2018 (CN) .......................... 201810723916.8

(51) Int. Cl.
 *G06K 9/00* (2006.01)
 *G09G 3/28* (2013.01)
 (Continued)

(52) U.S. Cl.
 CPC ......... *G06F 3/017* (2013.01); *G06K 9/00355* (2013.01); *G06K 9/6256* (2013.01)

(58) Field of Classification Search
 USPC ....... 382/100, 103, 106–107, 154, 162, 172, 382/173, 181, 199, 209, 219, 232, 254,
 (Continued)

(56) References Cited

U.S. PATENT DOCUMENTS 10,831,281 B2 * 11/2020 Yang ................. G06F 3/017
2009/0324008 A1 * 12/2009 Kongqiao .............. G06T 7/11
 382/103

(Continued)

FOREIGN PATENT DOCUMENTS

CN 103890782 A 6/2014
CN 105354532 A 2/2016
 (Continued)

OTHER PUBLICATIONS

First Office Action issued in CN Patent Application No. 201810720374.9 dated Apr. 10, 2020.

*Primary Examiner* — Seyed H Azarian
(74) *Attorney, Agent, or Firm* — Dilworth IP, LLC

(57) ABSTRACT

The present disclosure provides a method, a device and a readable storage medium for processing a control instruction based on gesture recognition, the method including: obtaining a trigger-gesture-recognition instruction; capturing a set of to-be-recognized images corresponding to a to-be-recognized user according to the trigger-gesture-recognition instruction, where the set of to-be-recognized images includes to-be-recognized images of multiple frames; determining location information of a hand of the to-be-recognized user respectively in each frame of the to-be-recognized images via a preset body recognizing model; and according to the location information, obtaining gesture information corresponding to the hand via a preset gesture recognizing model; and according to the gesture information corresponding to the hand, obtaining a control instruction corresponding to the gesture information. Thus, the amount of computation for gesture recognition is reduced, and efficiency of gesture recognition is improved, enabling a remote gesture control of an intelligent terminal.

10 Claims, 5 Drawing Sheets

(51) Int. Cl.
*G06F 3/01* (2006.01)
*G06K 9/62* (2006.01)

(58) Field of Classification Search
USPC ......... 382/276, 285–291, 305, 312; 345/156, 345/166
See application file for complete search history.

(56) References Cited

U.S. PATENT DOCUMENTS

| | | | |
|---|---|---|---|
| 2014/0028550 A1* | 1/2014 | Adhikari | G06K 9/00335 345/156 |
| 2018/0307319 A1* | 10/2018 | Karmon | G06K 9/00389 |
| 2019/0107894 A1* | 4/2019 | Hebbalaguppe | G06F 3/011 |
| 2020/0380690 A1* | 12/2020 | Cheng | G06K 9/00248 |

FOREIGN PATENT DOCUMENTS

| | | |
|---|---|---|
| CN | 107368820 A | 11/2017 |
| CN | 108052927 A | 5/2018 |
| CN | 108181989 A | 6/2018 |
| CN | 108229391 A | 6/2018 |

* cited by examiner

METHOD, DEVICE AND READABLE STORAGE MEDIUM FOR PROCESSING CONTROL INSTRUCTION BASED ON GESTURE RECOGNITION

CROSS-REFERENCE TO RELATED APPLICATIONS

This application claims priority to Chinese Patent Application No. 201810723916.8, filed on Jul. 4, 2018, which is hereby incorporated by reference in its entirety.

TECHNICAL FIELD

The present disclosure relates to the field of image recognition and, in particular, to a method, a device and a readable storage medium for processing a control instruction based on gesture recognition.

BACKGROUND

With the development of science and technology, more and more intelligent terminals, such as a set-top box, a television, and a computer, etc., come into users' life. However, a current intelligent terminal generally requires a user to send a control instruction to the intelligent terminal via a keyboard, a mouse, a remote control or other control instruction sending apparatuses to control the intelligent terminal. Hence, user operations can sometimes be cumbersome, or even the intelligent terminal cannot be controlled when the control instruction sending apparatus is not handy for the user.

A method for controlling an intelligent terminal by gesture is proposed in the prior art, where the intelligent terminal obtains an image of a current motion of a user, performs gesture recognition on the image directly via a gesture recognizing model, determines the user's current gesture and executes an operation corresponding to the gesture, thus the user can control the intelligent terminal directly through a body motion without relying on a control instruction sending device, enabling more flexible user operations, and improving user experience.

However, when an intelligent terminal is controlled with the above-described method, a users gesture often covers only a small proportion of the image in comparison to the whole image, therefore, it is inefficient to look for the users gesture in the image directly. Besides, the user's current gesture information is often not able to be accurately obtained when the user is far away from the intelligent terminal, which may cause a failure to control the intelligent terminal.

SUMMARY

The present disclosure provides a method, a device and a readable storage medium for processing a control instruction based on gesture recognition, which are used to solve the technical problem in the prior art that user's hand covering a small proportion of image in gesture recognition causes low efficiency of gesture recognition and a large amount of computation.

According to a first aspect, the present disclosure provides a method for processing a control instruction based on gesture recognition, including:

obtaining a trigger-gesture-recognition instruction;

capturing a set of to-be-recognized images corresponding to a to-be-recognized user according to the trigger-gesture-recognition instruction, where the set of to-be-recognized images includes to-be-recognized images of multiple frames;

determining location information of a hand of the to-be-recognized user respectively in each frame of the to-be-recognized images via a preset body recognizing model; and according to the location information of the hand of the to-be-recognized user in each frame of the to-be-recognized images, obtaining gesture information corresponding to the hand via a preset gesture recognizing model; and according to the gesture information corresponding to the hand, obtaining the control instruction corresponding to the gesture information.

According to another aspect, the present disclosure provides a device for processing a control instruction based on gesture recognition, including:

an instruction obtaining module, configured to obtain a trigger-gesture-recognition instruction;

a to-be-recognized image set capturing module, configured to capture a set of to-be-recognized images corresponding to a to-be-recognized user according to the trigger-gesture-recognition instruction, where the set of to-be-recognized images includes to-be-recognized images of multiple frames;

a gesture information recognizing module, configured to determine location information of a hand of the to-be-recognized user respectively in each frame of the to-be-recognized images via a preset body recognizing model and obtain gesture information corresponding to the hand via a preset gesture recognizing model according to the location information of the hand of the to-be-recognized user in each frame of the to-be-recognized images; and a control instruction obtaining module, configured to obtain, according to the gesture information corresponding to the hand, a control instruction corresponding to the gesture information.

According to yet another aspect, the present disclosure provides a device for processing a control instruction based on gesture recognition, including: a memory and a processor;

the memory is configured to store an instruction executable by the processor; and the processor is configured to perform the method as described above.

According to yet another aspect, the present disclosure provides a computer readable storage medium, storing a computer-executed instruction, and the computer-executed instruction, when executed by a processor, implements the method as described above.

In the method, the device and the readable storage medium for processing a control instruction based on gesture recognition provided in the present disclosure, a trigger-gesture-recognition instruction is obtained; a set of to-be-recognized images corresponding to a to-be-recognized user are captured according to the trigger-gesture-recognition instruction, where the set of to-be-recognized images includes to-be-recognized images of multiple frames; location information of a hand of the to-be-recognized user respectively in each frame of the to-be-recognized images via a preset body recognizing model is determined via a preset body recognizing model, and according to the location information of the hand of the to-be-recognized user in each frame of the to-be-recognized images, gesture information corresponding to the hand is obtained via a preset gesture recognizing model; and according to the gesture information corresponding to the hand, the control instruction corresponding to the gesture information is obtained.

Because locations of a user's hand in the to-be-recognized images are recognized before gesture recognition is performed on current to-be-recognized images, the amount of computation for gesture recognition is reduced, the efficiency of gesture recognition is improved, and then it is possible to achieve a remote gesture control of an intelligent terminal.

BRIEF DESCRIPTION OF DRAWINGS

To describe the technical solutions in embodiments of the present disclosure or in the prior art more clearly, the following briefly introduces the accompanying drawings needed for describing the embodiments or the prior art. Apparently, the accompanying drawings in the following description illustrate merely some embodiments of the present disclosure, and those of ordinary skill in the art may still derive other drawings from these accompanying drawings.

DESCRIPTION OF EMBODIMENTS

In order to make objectives, technical solutions and advantages of the embodiments of the present disclosure clearer, the technical solutions of the embodiments of the present disclosure will be described clearly and comprehensively below with reference to the drawings accompanying the embodiments. Apparently, the described embodiments are part rather than all of the embodiments of the present disclosure. All the other embodiments obtained based on the embodiments of the present disclosure are within the protection scope of the present disclosure.

Figure 1:
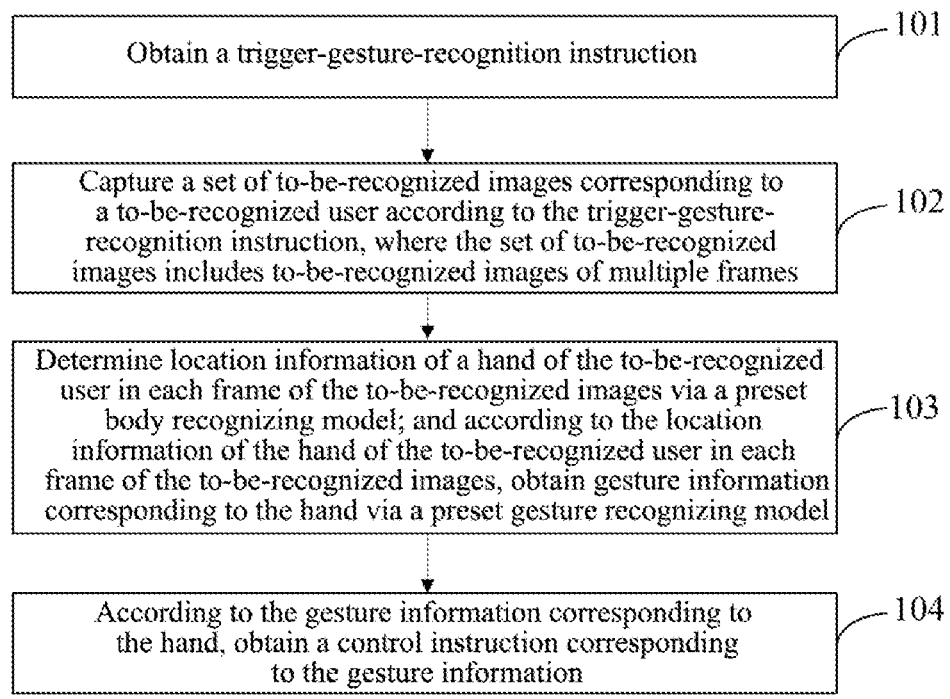
FIG. 1 is a schematic flowchart of a method for processing a control instruction based on gesture recognition according to a first embodiment of the present disclosure.

FIG. 1 is a schematic flowchart of a method for processing a control instruction based on gesture recognition according to a first embodiment of the present disclosure. As shown in FIG. 1, the method includes:

Step 101: obtaining a trigger-gesture-recognition instruction.

The executive body of this embodiment is any intelligent terminal that supports gesture recognition, such as a television, a computer, and a set-top box. In a practical application, to conserve power, the intelligent terminal may not always be in a gesture recognizing state. So, in order to correctly recognize a gesture made by a user, a trigger-gesture-recognition instruction is required to be obtained.

For instance, it may be a preset triggering posture, and accordingly, the intelligent terminal may capture the user's motion in real time within a shooting range of the intelligent terminal, compare a posture in a captured image with a preset triggering posture, and start to recognize gesture information if a similarity therebetween exceeds a preset threshold. It should be noted that the trigger-gesture-recognition instruction may be any instruction that enables an initiation of gesture recognition for the intelligent terminal, which is not limited in the present disclosure.

Step 102: capturing a set of to-be-recognized images corresponding to a to-be-recognized user according to the trigger-gesture-recognition instruction, where the set of to-be-recognized images includes to-be-recognized images of multiple frames.

In this embodiment, after the trigger-gesture-recognition instruction is received, it is possible to capture a current to-be-recognized image of the to-be-recognized user according to the trigger-gesture-recognition instruction. Specifically, during an image capturing process, multiple to-be-recognized images can be captured in an extremely short time. Additionally, if an image is captured at a time when a right gesture is not made by the user, it is not possible to control the intelligent terminal by the captured image. Thus, in order to improve an accuracy of gesture recognition by the intelligent terminal, it is possible to capture a set of to-be-recognized images of the to-be-recognized user at present according to the trigger-gesture-recognition instruction, where the set of to-be-recognized images includes to-be-recognized images of multiple frames.

Step 103: determining location information of a hand of the to-be-recognized user respectively in each frame of the to-be-recognized images via a preset body recognizing model; and according to the location information of the hand of the to-be-recognized user in each frame of the to-be-recognized images, obtaining gesture information corresponding to the hand via a preset gesture recognizing model.

In this embodiment, after the set of to-be-recognized images are obtained, recognition may be performed on each frame in the set of to-be-recognized images according to the preset body recognizing model, so as to determine the location information of the hand of the to-be-recognized user in each frame of the to-be-recognized images. After the location information of the to-be-recognized user's gesture is determined, it is possible to recognize the gesture information of the user in each frame via the preset gesture recognizing model according to the location information of the hand of the to-be-recognized user in each frame of the to-be-recognized images. Since the set of to-be-recognized images includes to-be-recognized images of multiple frames, if a similarity between multiple pieces of gesture information recognized by the gesture recognizing model is greater than a preset threshold, the gesture information can be determined to correspond to a stationary gesture, and if the similarity between the multiple pieces of gesture information recognized by the gesture recognizing model is relatively low, the gesture information can be determined to correspond to a dynamic gesture. Because before gesture recognition is performed on current to-be-recognized images, locations of a user's hand in the to-be-recognized images are recognized, the amount of computation for gesture recognition can be reduced, and the efficiency of gesture recognition can be improved.

Step 104: according to the gesture information corresponding to the hand, obtaining a control instruction corresponding to the gesture information.

In this embodiment, after the gesture information corresponding to the user's hand is determined via the gesture recognizing model, it is possible to determine a control instruction corresponding to the gesture information according to the gesture information, and to execute the control instruction, so that controlling the intelligent terminal with a gesture can be achieved.

In the method for processing a control instruction based on gesture recognition provided in this embodiment, a trigger-gesture-recognition instruction is obtained; a set of to-be-recognized images corresponding to a to-be-recognized user are captured according to the trigger-gesture-recognition instruction, where the set of to-be-recognized images includes to-be-recognized images of multiple frames; location information of a hand of the to-be-recognized user respectively in each frame of the to-be-recognized images via a preset body recognizing model is determined via a preset body recognizing model, and according to the location information of the hand of the to-be-recognized user in each frame of the to-be-recognized images, gesture information corresponding to the hand is obtained via a preset gesture recognizing model; and according to the gesture information corresponding to the hand, a control instruction corresponding to the gesture information is obtained. Because locations of a user's hand in the to-be-recognized images are recognized before gesture recognition is performed on current to-be-recognized images, the amount of computation for gesture recognition can be reduced, the efficiency of gesture recognition can be improved, making it possible to achieve a remote gesture control of an intelligent terminal.

Based on the above-described embodiment, the method further includes:

obtaining a trigger-gesture-recognition instruction;

capturing a set of to-be-recognized images corresponding to a to-be-recognized user according to the trigger-gesture-recognition instruction, where the set of to-be-recognized images includes to-be-recognized images of multiple frames;

for each frame of the to-be-recognized images, via the preset body recognizing model, recognizing respective body parts of the to-be-recognized user from the to-be-recognized images and according to the respective body parts, performing analysis to determine a hand of the to-be-recognized user and location information of the hand in the to-be-recognized images;

according to the location information of the hand of the to-be-recognized user in each frame of the to-be-recognized images, obtaining gesture information corresponding to the hand via a preset gesture recognizing model; and according to the gesture information corresponding to the hand, obtaining a control instruction corresponding to the gesture information.

In this embodiment, after the set of to-be-recognized images corresponding to the to-be-recognized user are captured according to the trigger-gesture-recognition instruction, it is possible to recognize respective body parts of the to-be-recognized user from the to-be-recognized images via the preset body recognizing model for each frame of the to-be-recognized images in the set of to-be-recognized images, and to perform analysis according to the respective body parts, so as to determine the hand of the to-be-recognized user, thus, locations of the hand of the to-be-recognized user in the to-be-recognized images can be determined. Taking an practical application as an example, for each frame, it is possible to determine information of a head, a trunk, arms and legs, etc., of the to-be-recognized user in the image according to the preset body recognizing model, and deduce the hand of the to-be-recognized user according to the respective body parts that are currently obtained, and thus determine the locations of the hand of the to-be-recognized user in the to-be-recognized images.

In the method for processing a control instruction based on gesture recognition provided in this embodiment, the locations of the hand of the to-be-recognized user in the to-be-recognized images are determined via the body recognizing model before performing the gesture recognition, thus reducing the amount of computation for the subsequent gesture recognition, improving the recognition efficiency, and providing a basis for remote gesture recognition by the intelligent terminal.

Based on any one of the above-described embodiments, the method further includes:

obtaining a trigger-gesture-recognition instruction;

capturing a set of to-be-recognized images corresponding to a to-be-recognized user according to the trigger-gesture-recognition instruction, where the set of to-be-recognized images includes to-be-recognized images of multiple frames;

determining location information of a hand of the to-be-recognized user respectively in each frame of the to-be-recognized images via a preset body recognizing model; and according to the location information of the hand of the to-be-recognized user in each frame of the to-be-recognized images, obtaining gesture information corresponding to the hand via a preset gesture recognizing model;

if multiple candidate control instructions corresponding to the gesture information are obtained, according to a track and a direction of an movement of the hand from the gesture information, predicting gesture information corresponding to the hand; and according to the gesture information and the gesture information, determining the control instruction from the candidate control instructions.

In this embodiment, according to the trigger-gesture-recognition instruction, the set of to-be-recognized images corresponding to the to-be-recognized user are captured, and the user's gesture information is obtained via the preset body recognizing model and the gesture recognizing model, then whether the gesture information corresponds to multiple candidate control instructions can be determined. Since the gesture recognizing model performs recognition on to-be-recognized images of multiple frames, multiple gestures can be obtained. If multiple candidate control instructions are detected to correspond to the present gesture information, it is possible to perform a prediction according to the gesture information currently displayed by the to-be-recognized user according to the track and the direction of the movement of the user's hand from the recognized gesture information, determine the gesture information corresponding to the present gesture information, and according to the gesture information and the gesture information, determine the control instruction from the candidate control instructions. For example, if currently the gesture information corresponding to the hand of the to-be-recognized user is a semi-circle, and the semi-circle gesture information corresponds to multiple candidate control instructions, it is possible to predict a to-be-completed gesture to be displayed by the to-be-recognized user, such as a circular gesture, a wavelike gesture or else, according to the track and the direction of the movement of the hand from the gesture information, and determine the control instruction according to the predicted gesture.

In the method for processing a control instruction based on gesture recognition provided in this embodiment, the gesture information corresponding to the hand is predicted according to the track and the direction of the movement of the hand in the gesture information when the gesture information corresponds to multiple candidate control instructions, and the control instruction is determined from the candidate control instructions according to the gesture information and the gesture information, thus improving the efficiency of gesture recognition.

Figure 2:
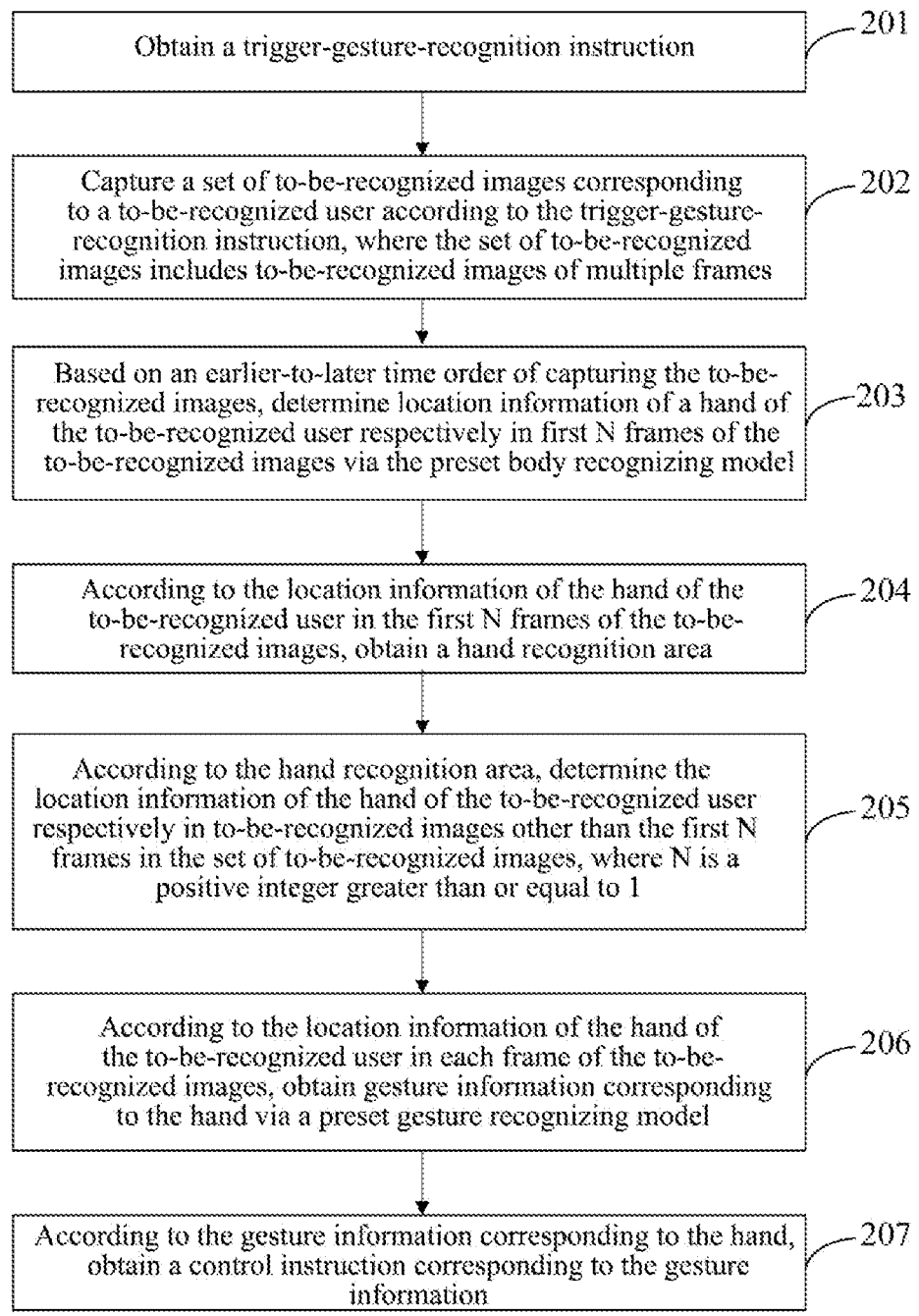
FIG. 2 is a schematic flowchart of a method for processing a control instruction based on gesture recognition according to a second embodiment of the present disclosure.

FIG. 2 is a schematic flowchart of a method for processing a control instruction based on gesture recognition according to a second embodiment of the present disclosure, based on the above-described embodiments. As shown in FIG. 2, the method includes:

Step 201: obtaining a trigger-gesture-recognition instruction.

Step 202: capturing a set of to-be-recognized images corresponding to a to-be-recognized user according to the trigger-gesture-recognition instruction, where the set of to-be-recognized images includes to-be-recognized images of multiple frames.

Step 203: based on an earlier-to-later time order of capturing the to-be-recognized images, determining the location information of the hand of the to-be-recognized user respectively in first N frames of the to-be-recognized images via the preset body recognizing model.

Step 204: according to the location information of the hand of the to-be-recognized user in the first N frames of the to-be-recognized images, obtaining a hand recognition area;

Step 205: according to the hand recognition area, determining the location information of the hand of the to-be-recognized user respectively in to-be-recognized images other than the first N frames in the set of to-be-recognized images, where N is a positive integer greater than or equal to 1;

Step 206: according to the location information of the hand of the to-be-recognized user in each frame of the to-be-recognized images, obtaining gesture information corresponding to the hand via a preset gesture recognizing model; and Step 207: according to the gesture information corresponding to the hand, obtaining a control instruction corresponding to the gesture information.

In this embodiment, after the location information of the hand of the to-be-recognized user is recognized via the body recognizing model, since a movement range of the hand of the to-be-recognized user is relatively small, a prediction can be made according to a present moving speed of the hand of the to-be-recognized user. After the present movement range of the hand of the to-be-recognized user is determined, recognition with subsequent frames can be directly performed via the gesture recognizing model within this range, thus the efficiency of gesture recognition is improved, and the process of gesture recognition is simplified. Specifically, according to the trigger-gesture-recognition instruction, the set of to-be-recognized images corresponding to the to-be-recognized user are captured. Then, based on an earlier-to-later time order of capturing the to-be-recognized images, the location information of the hand of the to-be-recognized user respectively in the first N frames of the to-be-recognized images can be determined via the preset body recognizing model. Then the hand recognition area can be determined according to the location information of the hand of the to-be-recognized user in the first N frames of the to-be-recognized images, thus gesture recognition with the to-be-recognized images other than the first N frames in the set of to-be-recognized images can all be performed within the hand recognition area via the gesture recognizing model, and according to the gesture information obtained through recognition, the corresponding control instruction can be obtained, where N is a positive integer greater than or equal to 1.

As an implementable manner, according to the trigger-gesture-recognition instruction, the set of to-be-recognized images corresponding to the to-be-recognized user are captured. Then, the location information of the hand of the to-be-recognized user in the first N frames of the to-be-recognized images can be recognized via the body recognizing model, and in respect of the to-be-recognized images other than the first N frames in the set of to-be-recognized images, it is possible to track the hand of the to-be-recognized user via a tracking algorithm, and recognize a gesture of the to-be-recognized user via the gesture recognizing model, so as to determine the gesture information of the to-be-recognized user, and obtain a corresponding control instruction according to the gesture information obtained through recognition.

In the method for processing a control instruction based on gesture recognition provided in this embodiment, after the locations of the hand of the to-be-recognized user in the first N frames of the to-be-recognized images are determined, the present movement range of the hand of the to-be-recognized user can be determined, thus gesture recognition with the to-be-recognized images other than the first N frames in the set of to-be-recognized images can all be performed within the hand recognition area via the gesture recognizing model. Thus, it is possible to further simplify the process of gesture recognition on the basis of improving the efficiency of gesture recognition.

Figure 3:
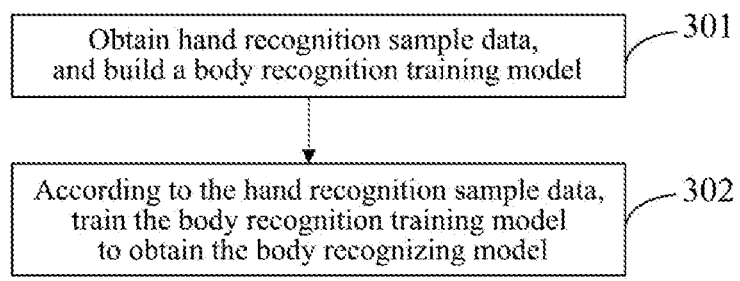
FIG. 3 is a schematic flowchart of a method for processing a control instruction based on gesture recognition according to a third embodiment of the present disclosure.

FIG. 3 is a schematic flowchart of a method for processing a control instruction based on gesture recognition according to a third embodiment of the present disclosure, and based on any one of the above-described embodiments, as shown in FIG. 3, the method includes:

Step 301: obtaining hand recognition sample data, and building a body recognition training model; and Step 302: according to the hand recognition sample data, training the body recognition training model to obtain the body recognizing model.

In this embodiment, before gesture recognition is performed, it is possible to obtain multiple hand recognition sample data, to build the body recognition training model, to divide the aforementioned hand recognition sample data randomly into a training set and a testing set, to train the body recognition training model, and to obtain the body recognizing model, so that, afterwards, the location of the hand of the to-be-recognized user can be recognized via the body recognizing model.

In the method for processing a control instruction based on gesture recognition provided in this embodiment, the body recognizing model is pre-built so as to recognize the location of the hand of the to-be-recognized user via the body recognizing model afterwards, providing a basis for improving the efficiency of hand recognition.

Based on any one of the above-described embodiments, the method further includes:

obtaining gesture recognition sample data, and building a gesture recognition training model; and according to the gesture recognition sample data, training the gesture recognition training model to obtain the gesture recognizing model.

In this embodiment, before gesture recognition is performed, multiple gesture recognition sample data may be obtained, and the gesture recognition training model may be built. The aforementioned gesture recognition sample data may be divided randomly into a training set and a testing set. The gesture recognition training model is trained to obtain the gesture recognizing model, so that, afterwards, the gesture of the to-be-recognized user can be recognized via the gesture recognizing model.

In the method for processing a control instruction based on gesture recognition provided in this embodiment, the gesture recognizing model is pre-built, so as to recognize the gesture of the to-be-recognized user via the gesture recognizing model afterwards, providing a basis for improving the gesture recognition efficiency.

Figure 4:
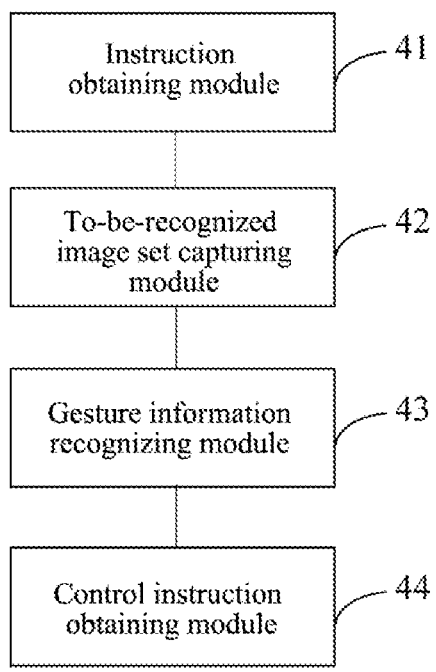
FIG. 4 is a schematic structural diagram of a device for processing a control instruction based on gesture recognition according to a forth embodiment of the present disclosure.

FIG. 4 is a schematic diagram of a device for processing a control instruction based on gesture recognition according to a forth embodiment of the present disclosure. As shown in FIG. 4, the device includes:

an instruction obtaining module 41, configured to obtain a trigger-gesture-recognition instruction;

a to-be-recognized image set capturing module 42, configured to capture a set of to-be-recognized images corresponding to a to-be-recognized user according to the trigger-gesture-recognition instruction, where the set of to-be-recognized images includes to-be-recognized images of multiple frames;

a gesture information recognizing module 43, configured to: determine location information of a hand of the to-be-recognized user respectively in each frame of the to-be-recognized images via a preset body recognizing model; and according to the location information of the hand of the to-be-recognized user in each frame of the to-be-recognized images, obtain gesture information corresponding to the hand via a preset gesture recognizing model; and a control instruction obtaining module 44, configured to obtain, according to the gesture information corresponding to the hand, a control instruction corresponding to the gesture information.

With the device for processing a control instruction based on gesture recognition provided in the present disclosure, a trigger-gesture-recognition instruction is obtained; a set of to-be-recognized images corresponding to a to-be-recognized user are captured according to the trigger-gesture-recognition instruction, where the set of to-be-recognized images includes to-be-recognized images of multiple frames; location information of a hand of the to-be-recognized user respectively in each frame of the to-be-recognized images via a preset body recognizing model is determined via a preset body recognizing model, and according to the location information of the hand of the to-be-recognized user in each frame of the to-be-recognized images, gesture information corresponding to the hand is obtained via a preset gesture recognizing model; and according to the gesture information corresponding to the hand, a control instruction corresponding to the gesture information is obtained. Because locations of a user's hand in the to-be-recognized images are recognized before gesture recognition is performed on current to-be-recognized images, the amount of computation for gesture recognition is reduced, the efficiency of gesture recognition is improved, making it possible to achieve a remote gesture control of an intelligent terminal.

Based on the above-described embodiment, the device further includes:

an instruction obtaining module, configured to obtain a trigger-gesture-recognition instruction;

a to-be-recognized image set capturing module, configured to capture a set of to-be-recognized images corresponding to a to-be-recognized user according to the trigger-gesture-recognition instruction, where the set of to-be-recognized images includes to-be-recognized images of multiple frames;

a gesture information recognizing module, specifically including:

a first hand location information determining unit, configured to: for each frame of the to-be-recognized images, via the preset body recognizing model, recognize respective body parts of the to-be-recognized user from the to-be-recognized images and according to the respective body parts, perform analysis to determine the hand of the to-be-recognized user and the location information of the hand in the to-be-recognized images;

the gesture information recognizing module being further configured to obtain, according to the location information of the hand of the to-be-recognized user in each frame of the to-be-recognized images, gesture information corresponding to the hand via a preset gesture recognizing model; and a control instruction obtaining module, configured to obtain, according to the gesture information corresponding to the hand, a control instruction corresponding to the gesture information.

With the device for processing a control instruction based on gesture recognition provided in this embodiment, the locations of the hand of the to-be-recognized user in the to-be-recognized images are determined via the body recognizing model before performing the gesture recognition, thus reducing the amount of computation for the subsequent gesture recognition, improving the recognition efficiency, and providing a basis for remote gesture recognition by the intelligent terminal.

Based on any one of the above-described embodiments, the device further includes:

an instruction obtaining module, configured to obtain a trigger-gesture-recognition instruction;

a to-be-recognized image set capturing module, configured to capture a set of to-be-recognized images corresponding to a to-be-recognized user according to the trigger-gesture-recognition instruction, where the set of to-be-recognized images includes to-be-recognized images of multiple frames;

a gesture information recognizing module, configured to: determine location information of a hand of the to-be-recognized user respectively in each frame of the to-be-recognized images via a preset body recognizing model; and according to the location information of the hand of the to-be-recognized user in each frame of the to-be-recognized images, obtain gesture information corresponding to the hand via a preset gesture recognizing model;

a control instruction obtaining module, specifically including:

a predicting unit, configured to predict to-be-completed gesture information corresponding to the hand according to a track and a direction of an movement of the hand from the gesture information if multiple candidate control instructions corresponding to the gesture information are obtained; and a determining unit, configured to determine the control instruction from the candidate control instructions according to the gesture information and the to-be-completed gesture information.

With the device for processing a control instruction based on gesture recognition provided in this embodiment, the to-be-competed gesture information corresponding to the hand is predicted according to the track and the direction of the movement of the hand from the gesture information when the gesture information corresponds to multiple candidate control instructions, and the control instruction is determined from the candidate control instructions according to the gesture information and the to-be-completed gesture information, thus improving the efficiency of gesture recognition.

Figure 5:
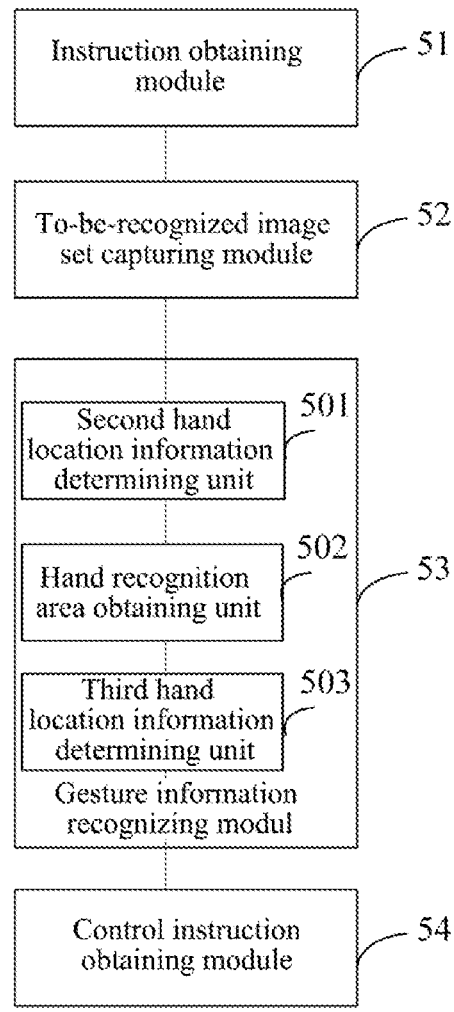
FIG. 5 is a schematic structural diagram of a device for processing a control instruction based on gesture recognition according to a fifth embodiment of the present disclosure.

FIG. 5 is a schematic structural diagram of a device for processing a control instruction based on gesture recognition according to a fifth embodiment of the present disclosure. Based on any one of the above-described embodiments, as shown in FIG. 5, the device includes:

an instruction obtaining module 51, configured to obtain a trigger-gesture-recognition instruction;

a to-be-recognized image set capturing module 52, configured to capture a set of to-be-recognized images corresponding to a to-be-recognized user according to the trigger-gesture-recognition instruction, where the set of to-be-recognized images includes to-be-recognized images of multiple frames;

a gesture information recognizing module 53, specifically including:

a second hand location information determining unit 501, configured to determine the location information of the hand of the to-be-recognized user respectively in first N frames of the to-be-recognized images via the preset body recognizing model, based on an earlier-to-later time order of capturing the to-be-recognized images;

a hand recognition area obtaining unit 502, configured to obtain a hand recognition area according to the location information of the hand of the to-be-recognized user in the first N frames of the to-be-recognized images;

a third hand location information determining unit 503, configured to determine the location information of the hand of the to-be-recognized user respectively in to-be-recognized images other than the first N frames in the set of to-be-recognized images according to the hand recognition area, where N is a positive integer greater than or equal to 1;

the gesture information recognizing module 53 being further configured to obtain gesture information corresponding to the hand via a preset gesture recognizing model according to the location information of the hand of the to-be-recognized user in each frame of the to-be-recognized images; and a control instruction obtaining module 54, configured to obtain, according to the gesture information corresponding to the hand, a control instruction corresponding to the gesture information.

With the device for processing a control instruction based on gesture recognition provided in this embodiment, after locations of the hand of the to-be-recognized user in the first N frames of the to-be-recognized images are determined, the present movement range of the hand of the to-be-recognized user can be determined, thus gesture recognition on the to-be-recognized images other than the first N frames in the set of to-be-recognized images can all be performed within the hand recognition area via the gesture recognizing model. Thus, it is possible to further simplify the process of gesture recognition on the basis of improving the efficiency of gesture recognition.

Figure 6:
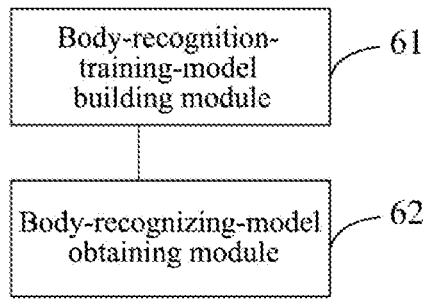
FIG. 6 is a schematic structural diagram of a device for processing a control instruction based on gesture recognition according to a sixth embodiment of the present disclosure.

FIG. 6 is a schematic structural diagram of a device for processing a control instruction based on gesture recognition according to a sixth embodiment of the present disclosure. Based on any one of the above-described embodiments, as shown in FIG. 6, the device further includes:

a body-recognition-training-model building module 61, configure to obtain hand recognition sample data, and build a body recognition training model; and a body-recognizing-model obtaining module 62, configured to train, according to the hand recognition sample data, the body recognition training model to obtain the body recognizing model.

With the device for processing a control instruction based on gesture recognition provided in this embodiment, the body recognizing model is pre-built, so as to recognize the location of the hand of the to-be-recognized user via the body recognizing model afterwards, providing a basis for improving the hand recognition efficiency.

Based on any one of the above-described embodiments, the device further includes:

a gesture-recognition-training-model building module, configured to obtain gesture recognition sample data, and build a gesture recognition training model; and a gesture-recognizing-model obtaining module, configured to train, according to the gesture recognition sample data, the gesture recognition training model to obtain the gesture recognizing model.

With the device for processing a control instruction based on gesture recognition provided in this embodiment, a gesture recognizing model is pre-built, so as to recognize the gesture of the to-be-recognized user via the gesture recognizing model afterwards, providing a basis for improving the efficiency in gesture recognition.

Figure 7:
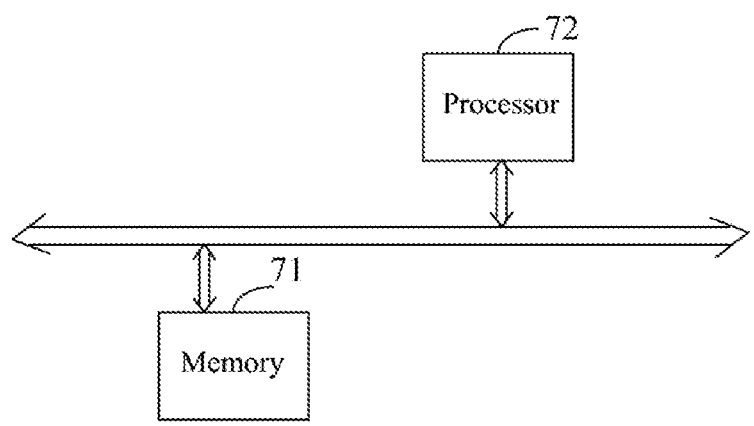
FIG. 7 is a schematic structural diagram of a device for processing a control instruction based on gesture recognition according to a seventh embodiment of the present disclosure.

FIG. 7 is a schematic structural diagram of a device for processing a control instruction based on gesture recognition according to a seventh embodiment of the present disclosure. Based on any one of the above-described embodiments, the device includes: a memory 71 and a processor 72;

the memory 71 is configured to store an instruction executable by the processor 72; and the processor 72 is configured to perform the method as described above.

Yet another embodiment of the present disclosure further provides a computer readable storage medium, storing a computer-executed instruction which, when executed by a processor, implements the method as described above.

It is clear to those of ordinary skill in the art that, for the convenience in and conciseness of description, references for the working process of the above-described devices can be made to the corresponding processes in the above-described method embodiments, which are not detailed here again.

It can be understood by those of ordinary skill in the art that, all or part of the steps for implementing the various method embodiments described above can be accomplished by hardware related to a program instruction. The program may be stored in a computer readable storage medium. The program, when executed, performs the steps including the foregoing method embodiments. The storage medium comprises any medium that can store program codes, such as a ROM, a RAM, a magnetic disk or an optical disk.

Finally, it is noted that the above embodiments are only used to describe the technical solutions of the present disclosure, and shall not be construed as limitations. Although the present disclosure has been described in considerable detail with reference to the foregoing embodiments, it should be understood by those skilled in the art that, modifications or equivalent substitutions can still be made to the technical solutions of the present disclosure, and such modifications or substitutions do not cause the essence of the resultant technical solution to deviate from the scope of the technical solutions of the embodiments according to the present disclosure.

What is claimed is:

1. A method for processing a control instruction based on gesture recognition, applied in an intelligent terminal, wherein the method comprises:
    obtaining a trigger-gesture-recognition instruction;
    capturing a set of to-be-recognized images corresponding to a to-be-recognized user according to the trigger-gesture-recognition instruction, wherein the set of to-be-recognized images includes to-be-recognized images of multiple frames;
    determining location information of a hand of the to-be-recognized user respectively in each frame of the to-be-recognized images via a preset body recognizing model; and according to the location information of the hand of the to-be-recognized user in each frame of the to-be-recognized images, obtaining gesture information corresponding to the hand via a preset gesture recognizing model; and
    obtaining, according to the gesture information corresponding to the hand, the control instruction corresponding to the gesture information;
    wherein the determining location information of the hand of the to-be-recognized user respectively in each frame of the to-be-recognized images via the preset body recognizing model comprises:
    based on an earlier-to-later time order of capturing the to-be-recognized images, determining the location information of the hand of the to-be-recognized user respectively in first N frames of the to-be-recognized images via the preset body recognizing model;
    according to the location information of the hand of the to-be-recognized user in the first N frames of the to-be-recognized images, obtaining a hand recognition area; and
    according to the hand recognition area, determining the location information of the hand of the to-be-recognized user respectively in to-be-recognized images other than the first N frames in the set of to-be-recognized images,
    wherein N is a positive integer greater than or equal to 1.

2. The method according to claim 1, wherein the obtaining, according to the gesture information corresponding to the hand, the control instruction corresponding to the gesture information comprises:
    if multiple candidate control instructions corresponding to the gesture information are obtained, according to a track and a direction of a movement of the hand from the gesture information, predicting to-be-completed gesture information corresponding to the hand; and
    according to the gesture information and the to-be-completed gesture information, determining the control instruction from the candidate control instructions.

3. The method according to claim 1, further comprising:
    obtaining hand recognition sample data, and building a body recognition training model; and
    according to the hand recognition sample data, training the body recognition training model to obtain the body recognizing model.

4. The method according to claim 1, further comprising:
    obtaining gesture recognition sample data, and building a gesture recognition training model; and
    according to the gesture recognition sample data, training the gesture recognition training model to obtain the gesture recognizing model.

5. A device for processing a control instruction based on gesture recognition, applied in an intelligent terminal, wherein the device comprises: a memory and a processor, wherein
    the memory is configured to store an instruction executable by the processor; and
    the processor is configured to perform the method according to claim 1.

6. A non-transitory computer readable storage medium, storing a computer-executed instruction which, when executed by a processor, implements the method according to claim 1.

7. A device for processing a control instruction based on gesture recognition, applied in an intelligent terminal, wherein the device comprises: a processor and a non-transitory computer-readable medium for storing program codes, which, when executed by the processor, cause the processor to:
    obtain a trigger-gesture-recognition instruction;
    capture a set of to-be-recognized images corresponding to a to-be-recognized user according to the trigger-gesture-recognition instruction, wherein the set of to-be-recognized images includes to-be-recognized images of multiple frames;
    determine location information of a hand of the to-be-recognized user respectively in each frame of the to-be-recognized images via a preset body recognizing model and obtain gesture information corresponding to the hand via a preset gesture recognizing model according to the location information of the hand of the to-be-recognized user in each frame of the to-be-recognized images; and
    obtain, according to the gesture information corresponding to the hand, the control instruction corresponding to the gesture information;
    wherein the program codes further cause the processor to:
    determine the location information of the hand of the to-be-recognized user respectively in first N frames of the to-be-recognized images via the preset body recognizing model based on an earlier-to-later time order of capturing the to-be-recognized images, wherein N is a positive integer greater than or equal to 1;
    obtain a hand recognition area according to the location information of the hand of the to-be-recognized user in the first N frames of the to-be-recognized images; and
    determine the location information of the hand of the to-be-recognized user respectively in to-be-recognized images other than the first N frames in the set of to-be-recognized images according to the hand recognition area.

8. The device according to claim 7, wherein the program codes further cause the processor to:
    predict to-be-completed gesture information corresponding to the hand according to a track and a direction of a movement of the hand from the gesture information if multiple candidate control instructions corresponding to the gesture information are obtained; and
    determine the control instruction from the candidate control instructions according to the gesture information and the to-be-completed gesture information.

9. The device according to claim 7, wherein the program codes further cause the processor to:
    obtain hand recognition sample data, and build a body recognition training model; and
    train, according to the hand recognition sample data, the body recognition training model to obtain the body recognizing model.

10. The device according to claim 7, wherein the program codes further cause the processor to:
- obtain gesture recognition sample data, and build a gesture recognition training model; and
- train, according to the gesture recognition sample data, the gesture recognition training model to obtain the gesture recognizing model.

\* \* \* \* \*